United States Patent
Becker et al.

[11] Patent Number: 6,065,920
[45] Date of Patent: May 23, 2000

[54] SECURING RING

[75] Inventors: Eberhard Becker; Thomas Düllmann, both of Hagen; Heinz Flaig, Bochum; Winfried Gievers, Wetter; Gregor Jansen, Bottrop; Hans-Hermann Osthoff, Wetter; Paul Saeftel, Castrop-Rauxel; Roland Staggl; Jan-Helge Steinkopf, both of Wetter; Manfred Stöber, Witten, all of Germany

[73] Assignee: Mannesmann AG, Düsseldorf, Germany

[21] Appl. No.: 09/293,714

[22] Filed: Apr. 16, 1999

[30] Foreign Application Priority Data

Apr. 17, 1998 [DE] Germany ............ 198 17 932

[51] Int. Cl.[7] .................................................. F16B 21/18
[52] U.S. Cl. ........................ 411/518; 411/353; 411/521
[58] Field of Search .................................. 411/517, 518, 411/519, 521, 353

[56] References Cited

U.S. PATENT DOCUMENTS

| | | | |
|---|---|---|---|
| 2,895,754 | 7/1959 | Wurzel | 411/518 |
| 3,701,303 | 10/1972 | Kondo | 411/518 |
| 4,142,704 | 3/1979 | Murray | . |
| 4,692,079 | 9/1987 | Killian et al. | . |

FOREIGN PATENT DOCUMENTS

| | | | |
|---|---|---|---|
| 1 497 512 | 9/1967 | France | . |
| 23 19 435 B2 | 10/1974 | Germany | . |
| 36 06 037 | 8/1987 | Germany | . |
| 137832 | 10/1952 | Sweden | 411/518 |

Primary Examiner—Neill Wilson
Attorney, Agent, or Firm—Henry M. Feiereisen

[57] ABSTRACT

A securing ring, includes a body defining a ring opening and having a circumference of substantially circular configuration at formation of a slotted gap to define confronting ring ends. The body defines a ring plane and an axis of symmetry and has a radial width which continuously increases, at least in sections, from the ring ends onwards at both sides of the axis of symmetry. Each of the ring ends has a L-shaped configuration and is extended by a lug jutting out from the ring plane and formed with a throughbore. Both lugs of the ring ends are positioned on a same side of the ring plane, with the throughbores of the lugs extending in parallel relationship to one another and to the ring plane.

8 Claims, 2 Drawing Sheets

SECURING RING

CROSS-REFERENCES TO RELATED APPLICATIONS

This application claims the priority of German Patent Application, Serial No. 198 17 932.4, filed Apr. 17, 1998, the subject matter of which is incorporated herein by reference.

BACKGROUND OF THE INVENTION

The present invention relates, in general to a securing ring, and more particularly to a split securing ring having a ring opening and a circumference of substantially circular configuration at formation of a slotted gap to define confronting ring ends.

German Pat. No. DE 23 19 435 B2 describes a securing ring of this type with a central, in particular cylindrical ring opening. This securing ring is of flat configuration and split at one point to thereby form confronting ring ends, whereby the split results in a radial gap. Oftentimes, the ring ends are each broadened in radial direction and formed with a throughbore, whereby both throughbores of the ring ends extend parallel to one another and perpendicular to the ring plane of the securing ring. The radial ring width normally decreases on both ring sides from the apex in direction towards the ring ends while the thickness of the ring remains constant. Insertable in the throughbores are upper ends of a spreading pliers by which the ring ends are pushed outwards so as to allow the ring to be mounted in a radial groove of a bolt or the like.

In order to use such a securing ring also in situations in which the mounting space is limited in a direction perpendicular to the ring plane, the application of cranked or angled pliers becomes necessary for properly mounting the securing ring.

German Pat. No. 23 19 435 B2 further describes the creation of a L-shaped element by bending the end zones at formation of a recess, whereby the L-shaped element extends in circumferential direction of the securing ring. Both L-shaped elements confront one another with their open side for allowing engagement of a complementary spreading pliers by which both ring ends are pushed apart outwardly. This type of securing ring is difficult to manufacture.

SUMMARY OF THE INVENTION

It is thus an object of the present invention to provide an improved securing ring, obviating the afore-stated drawbacks.

In particular, it is an object of the present invention to provide an improved securing ring which is easy to make and can easily be installed even in narrow spaces, without the need for cranked pliers.

These objects, and others which will become apparent hereinafter, are attained in accordance with the present invention by providing a body which includes a ring opening and has a circumference of substantially circular configuration at formation of a slotted gap to define confronting ring ends, with the body defining a ring plane and an axis of symmetry and having a radial width which continuously increases, at least along predetermined regions, from the ring ends onwards at both sides of the axis of symmetry, and by extending each L-shaped ring end by a lug which juts out from the ring plane and is formed with a throughbore, wherein both lugs are positioned on a same side of the ring plane, with the throughbores of the lugs extending in parallel relationship to one another and to the ring plane.

The present invention thus teaches the provision of a "cranked" securing ring which can be installed in a space that is only slightly greater than the securing ring itself. An accessible gap spacing which corresponds to the width of a typical spreading pliers is sufficient for installation of the securing ring, without requiring the use of cranked pliers.

According to another feature of the present invention, both lugs extend in a common plane which is oriented perpendicular to the ring plane, with the throughbores extending parallel to the axis of symmetry. In this manner, the securing ring can be handled easier, especially during installation. The installation can be further simplified when the common plane is arranged parallel to the tangential plane of the ring opening, whereby the tangential plane is oriented perpendicular to the axis of symmetry.

According to still another feature of the present invention, the lugs are made through bending the radially outwardly widened ring ends with respect to the ring plane, and both throughbores extend perpendicular to the ring plane before bending the ring ends.

The range of application of a securing ring according to the present invention can be expanded when positioning the throughbores at a distance to the ring plane, as in this case, the securing ring has a flat side without lugs.

BRIEF DESCRIPTION OF THE DRAWING

The above and other objects, features and advantages of the present invention will now be described in more detail with reference to the accompanying drawing, in which.

DETAILED DESCRIPTION OF PREFERRED EMBODIMENTS

Figure 1:
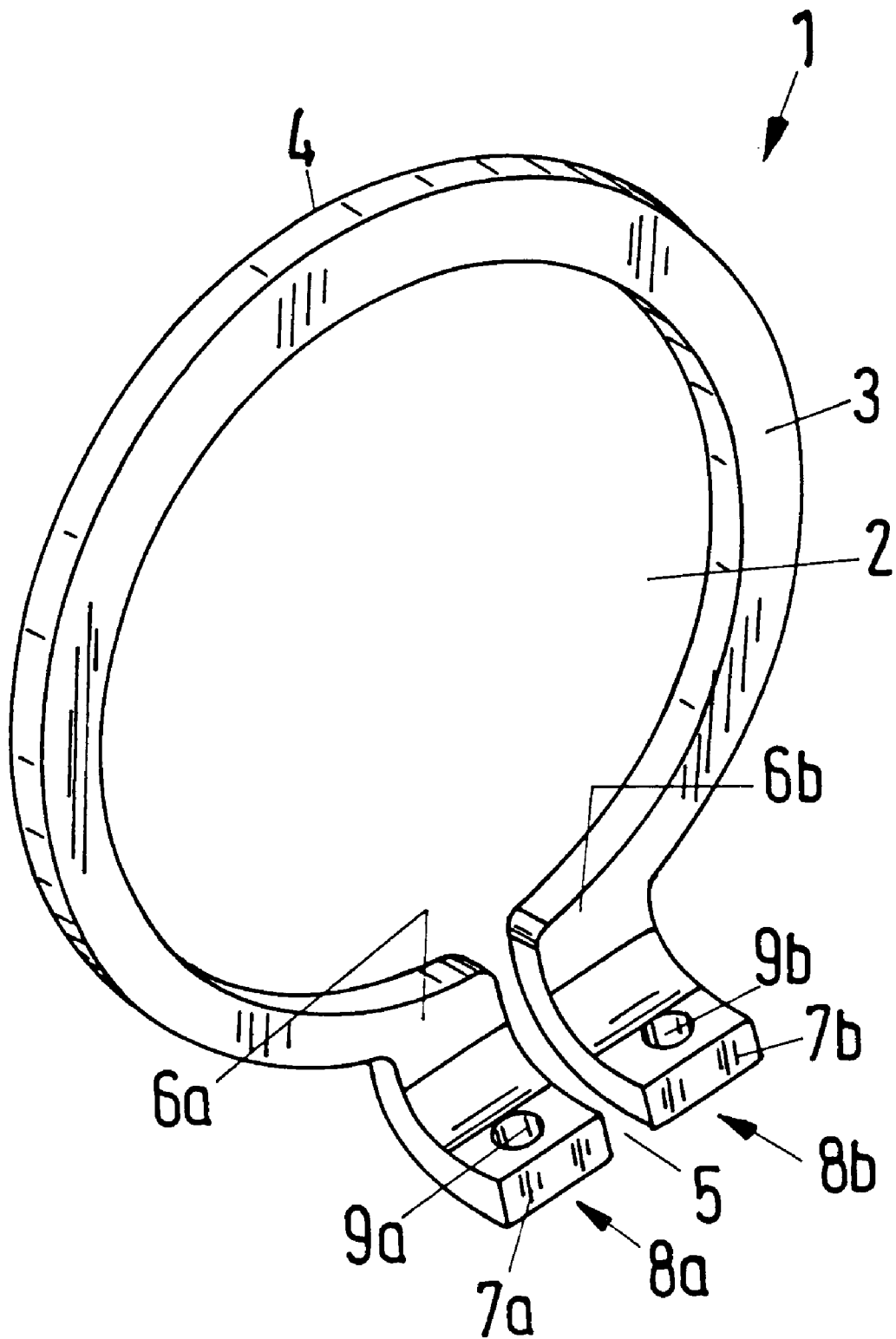
FIG. 1 is a perspective view of a securing ring according to the present invention.

Throughout all the Figures, same or corresponding elements are generally indicated by same reference numerals.

Figure 4:
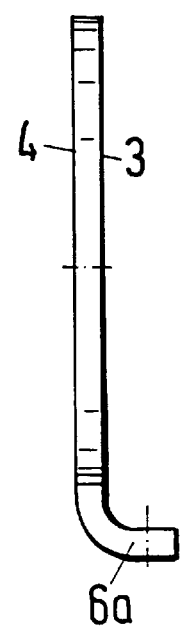
FIG. 4 is a side view of the securing ring of FIG. 1.

Turning now to the drawing, and in particular to FIG. 1, there is shown a perspective view of a securing ring according to the present invention, generally designated by reference numeral 1 and having a substantially flat body in the form of an incomplete circle to thereby define a slotted gap 5 which extends radially from inside to the outside. The securing ring 1 defines a ring plane and includes a central cylindrical ring opening 2. The body of the securing ring 1 is preferably made of spring steel and includes two ring-shaped side walls 3, 4 in parallel relationship. The gap 5 is bounded by confronting ring ends 6a, 6b which are broadened outwardly in radial direction to form prolongations 7a, 7b. These prolongations 7a, 7b are bent out from the ring plane so that the ring ends 6a, 6b exhibit a L-shaped configuration, as shown in particular in FIG. 4, thereby forming lugs 8a, 8b which jut outwards from the ring plane and are so positioned on a same side of the ring plane as to extend perpendicular to the ring plane.

As shown in FIG. 1, both lugs 8a, 8b are disposed in a common plane which extends parallel to a tangential plane that is oriented tangentially to the inner or outer cylindrical surface of the ring opening 2 at the gap 5, through which also the axis of symmetry 10 of the securing ring 1 extends. Both planes, i.e. the common plane and also the tangential plane are thus oriented perpendicular to the axis of symmetry 10.

Persons skilled in the art will understand that the upward bending of the radially broadened ring ends 6a, 6b to form the lugs 8a, 8b is only one possibility of many other possibilities to provide the ring ends 6a, 6b with the lugs 8a, 8b.

Figure 3:
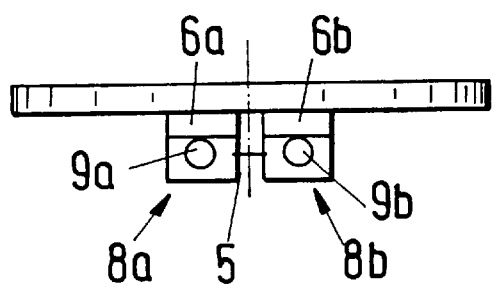
FIG. 3 is a top view of the securing ring of FIG. 1.

Each one of the lugs 8a, 8b has a throughbore 9a, 9b in the form of a cylindrical hole. The throughbores 9a, 9b extend parallel to one another, as shown in FIG. 3, as well as parallel to the ring plane and the axis of symmetry 10. Thus, both throughbores 9a, 9b are oriented parallel to the gap 5 and are engageable in a form-fitting manner by upper ends of a simple, uncranked, spreading pliers (not shown), thereby insuring a simple and safe handling.

Figure 2:
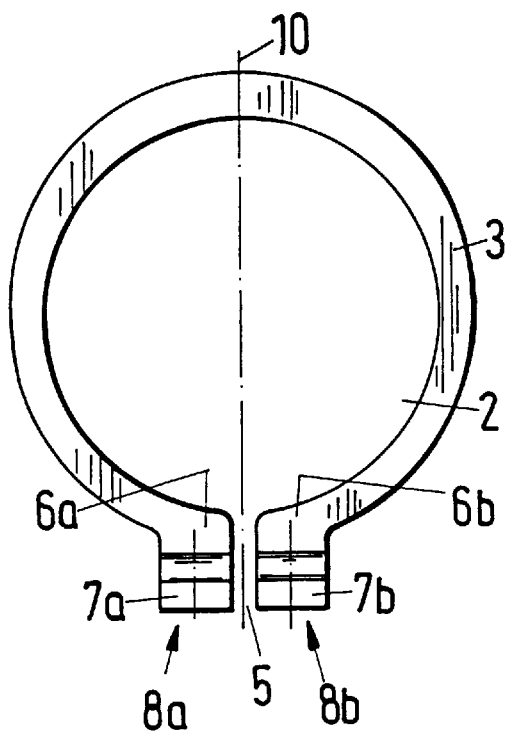
FIG. 2 is a front view of the securing ring of FIG. 1.

Turning now to FIG. 2, which illustrates a front plan view of the securing ring 1, it can be seen that the side walls 3, 4 are so configured that their radial ring width gradually decreases at both sides of the axis of symmetry 10 from the apex toward the ring ends 6a, 6b. It will be appreciated by persons skilled in the art that the radial decrease of the ring width may also be realized along predetermined regions, i.e. a region of constant ring width can be followed by a section with continuously decreasing ring width. The ring ends 6a, 6b are then configured as shown in FIG. 2.

While the invention has been illustrated and described as embodied in a securing ring, it is not intended to be limited to the details shown since various modifications and structural changes may be made without departing in any way from the spirit of the present invention.

What is desired to be protected by letters patent is set forth in the appended claims.

What is claimed is:

1. A securing ring, comprising a body made of spring steel and defining a ring opening, said body having a circumference of substantially circular configuration at formation of a slotted gap to define confronting ring ends, said body defining a ring plane and an axis of symmetry and having a radial width which widens, at least along predetermined regions, from the ring ends onwards at both sides of the axis of symmetry, each of said ring ends exhibiting a L-shaped configuration and being extended by a lug jutting out from the ring plane and formed with a throughbore, said lug of one of the ring ends and said lug of the other one of the ring ends being positioned on a same side of the ring plane, with the throughbores of the lugs extending in parallel relationship to one another and to the ring plane.

2. The securing ring of claim 1 wherein the throughbores extend parallel to the axis of symmetry.

3. The securing ring of claim 1 wherein the lugs extend in a common plane extending perpendicular to the ring plane.

4. The securing ring of claim 3 wherein the common plane extends parallel to a tangential plane of the ring opening, with the tangential plane extending perpendicular to the axis of symmetry.

5. The securing ring of claim 1 wherein the ring ends are each broadened radially outwards, said lugs being formed by bending the radially outwardly broadened ring ends out from the ring plane.

6. The securing ring of claim 5 wherein the throughbores extend perpendicular to the ring plane before bending the ring ends to form the lugs.

7. The securing ring of claim 1 wherein the throughbores extend at a distance to the ring plane.

8. The securing ring of claim 1 wherein the throughbore of each lug is formed by a cylindrical hole traversing the lug.

* * * * *